(12) United States Patent
Huculak et al.

(10) Patent No.: US 8,014,052 B2
(45) Date of Patent: Sep. 6, 2011

(54) SYSTEM AND METHOD FOR ILLUMINATION ATTENUATION

(75) Inventors: John C. Huculak, Mission Viejo, CA (US); Christopher Horvath, Irvine, CA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 12/787,811

(22) Filed: May 26, 2010

(65) Prior Publication Data

US 2010/0232002 A1    Sep. 16, 2010

Related U.S. Application Data

(62) Division of application No. 11/561,718, filed on Nov. 20, 2006, now Pat. No. 7,760,411.

(51) Int. Cl.
*G02B 26/02* (2006.01)
(52) U.S. Cl. ......... 359/230; 359/227; 359/234; 359/900
(58) Field of Classification Search .......... 359/227–236; 709/205
See application file for complete search history.

(56) References Cited

U.S. PATENT DOCUMENTS

| 4,680,968 | A | | 7/1987 | Sodeikat |
| 4,783,787 | A | | 11/1988 | Doi et al. |
| 5,794,761 | A | * | 8/1998 | Renaud et al. ............... 200/181 |
| 6,771,850 | B1 | | 8/2004 | Greywall |

FOREIGN PATENT DOCUMENTS

DE    19908514 A1    9/2000

OTHER PUBLICATIONS

Ching, et al., "MicrofabricatedOptical Shopper", Optical Engineering, Nov. 1994, 3634-42, 33:11.
Giles, et al., "A Silicon MEMS Optical Switch Attenuator and Its Use in Lightwave Subsystems", IEEE Journal of Selected Topics in Quantum Electronics, Jan./Feb. 1999, 18-25, 5:1.

* cited by examiner

*Primary Examiner* — James Phan
(74) *Attorney, Agent, or Firm* — Keiko Ichiye

(57) ABSTRACT

Generally speaking, the output brightness of an illuminator is varied by chopping an output light beam such that the beam is alternately interrupted and unhindered. An interrupter can be rapidly moved into and out of the transmission path of a light beam. The brightness of the light beam received at a site will be attenuated based on the amount of time per cycle the light beam remains obstructed versus unhindered.

4 Claims, 4 Drawing Sheets

SYSTEM AND METHOD FOR ILLUMINATION ATTENUATION

This application is a divisional of U.S. application Ser. No. 11/561,718 filed on Nov. 20, 2006, now U.S. Pat. No. 7,760,411.

TECHNICAL FIELD OF THE INVENTION

Embodiments of the present invention relate to systems and methods for attenuating the brightness of a light beam. More particularly, embodiments of the present invention relate to systems and methods for time domain attenuators.

BACKGROUND OF THE INVENTION

Surgical instrumentation often uses fiber optics to direct light from a light source, such as a laser, LED or other light source, to a surgical hand piece. The tip of the surgical hand piece is then used to direct the light to the eye. In some cases, it is desirable to attenuate the brightness of the light received at the eye. Currently, position domain attenuators that proportionally interrupt part, or all, of a light beam are used. In these systems, a non-optically transmissive element is positioned to prevent a part of the light beam from reaching the target fiber, resulting in some attenuation. Position domain attenuators include rotating louvers, variable slot width obstructions, varying aperture size obstructions and varying neutral density filters. By obstructing just a portion of the light beam, the quality of the illuminated spot projected from the end of the fiber can be affected. For example, the projected spot on the eye may have a bright center from the light that is not obstructed as well as shadow and color rings from the light that was obstructed. Indeed, the center of the spot may exhibit no attenuation, while the edges of the spot are highly attenuated. This result can be undesirable as it provides an uneven energy distribution to the eye.

Another current attenuation approach includes adjusting the voltage or current of the light source, thereby changing the intensity of the produced light. While this approach can evenly attenuate the brightness of the light spot received at the eye, it suffers the shortcoming that the color temperature of the light is typically changed.

SUMMARY OF THE INVENTION

Embodiments of the present invention provide systems and methods for attenuating the brightness of a light beam. Broadly speaking, an interrupter is moved completely into and fully out of the path of the light beam. This chopping of the light beam attenuates the beam. If the movement of the interrupter is quick enough and the repetition rate of the interrupter cycle high enough, the interruption of the light beam is not perceived by the human eye and the light beam simply appears attenuated.

Embodiments of the present invention include a light attenuation system comprising a light source to project a light beam, an interrupter operable to move into and out of a path of the light beam, a motor (actuator) coupled to the interrupter to move the interrupter from a position in which the light beam is unhindered by the interrupter to a position in which the light beam is incident on the interrupter, and a controller operable to control the motor and cause the motor to move the interrupter with a repetition rate so that the light beam is unhindered for a first portion of a cycle and the light beam is incident on the interrupter for a second portion of the cycle. When the light beam is incident on the interrupter, it can be fully incident on the interrupter. Attenuation can thus be achieved without affecting the color temperature of the light.

Another embodiment of the present invention can include a set of computer instructions comprising instructions executable to receive one or more attenuation control parameters. The attenuation control parameters can include any variables that can be user specified. In accordance with the implementation, these can include duty cycle, cycle time, repetition rate, attenuation level or other parameters. Based on the received control parameters and/or predefined control parameters, the instructions are executable to determine a control scheme. For example, the controller can determine the amount of time that a light beam should be fully interrupted and unhindered. Accordingly, the control scheme is configured to cause an interrupter to move into and out of a path of a light beam for a plurality of cycles with a repetition rate to attenuate the light beam's brightness.

Yet another embodiment of the present invention includes a method for attenuating light comprising projecting a light beam along a path and moving an interrupter into and out of the path of the light beam for a plurality of cycles with a repetition rate to attenuate the light beam's brightness without affecting the color temperature of the light beam. The light beam is unhindered by the interrupter for a first portion of each cycle and is incident (e.g., fully incident) on the interrupter for the second portion of the cycle.

Another embodiment of the present invention includes a method for attenuating light comprising projecting a light beam along a path and moving an interrupter into and out of the path of the light beam for a plurality of cycles with a repetition rate to create attenuated light that appears attenuated and continuous to the human eye. According to one embodiment light beam is unhindered by the interrupter for a first portion of each cycle and is incident (e.g., fully incident) on the interrupter for the second portion of the cycle.

Embodiments of the present invention provide an advantage over the prior art by attenuating the brightness of a light beam while minimizing deleterious effects such as shadow and color rings caused by position domain attenuators.

Embodiments of the present invention provide another advantage by allowing for attenuation of a light beam without changing the color temperature of the light, as occurs with attenuation schemes in which the intensity of the light source is varied by reducing the power delivered to the light source.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Figure 1B:
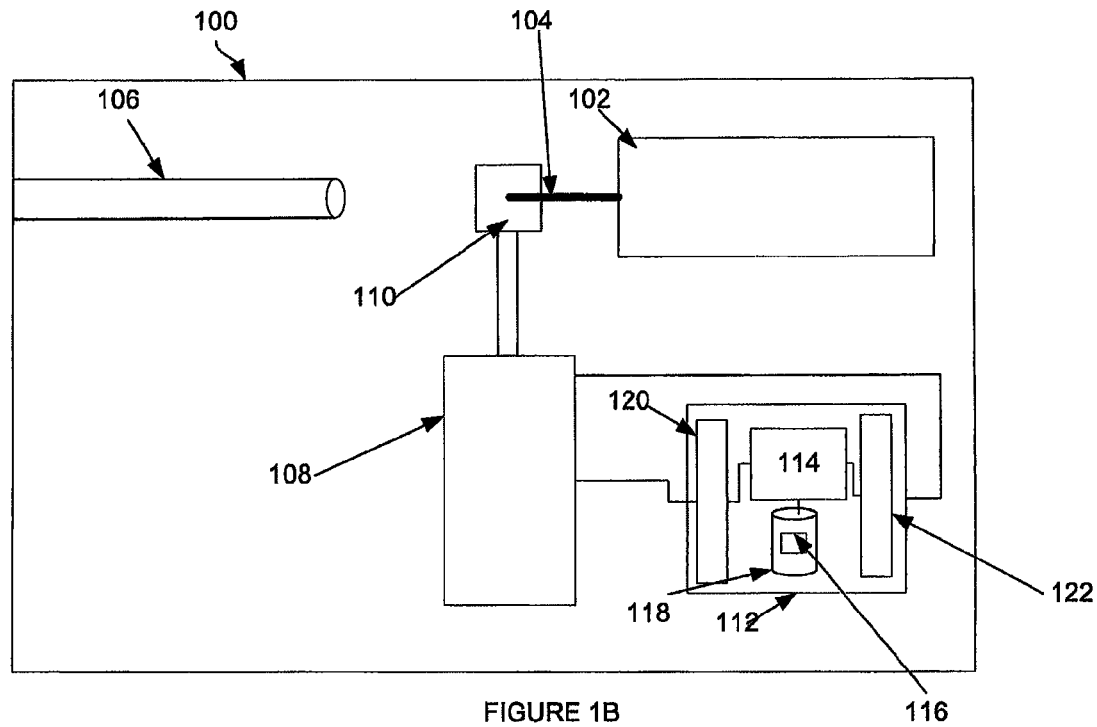
FIGS. 1A and 1B are diagrammatic representations of one embodiment of a system for attenuating a light beam in a surgical system utilizing fiber optics.

Preferred embodiments of the invention are illustrated in the FIGURES, like numerals being used to refer to like and corresponding parts of the various drawings.

Embodiments of the present invention provide systems and methods for attenuating light in a manner that reduces or eliminates the shadow and color ring effects of position domain attenuators without affecting the color temperature of the light. In other words, embodiments provide for even attenuation of the light beam without affecting the quality of the intensity distribution or color of the light.

Generally speaking, the output brightness of an illuminator is varied by alternately chopping the light beam such that the beam is both fully interrupted and fully unhindered. An interrupter can be rapidly moved into and out of the transmission path of a light beam. The brightness of the light beam received at a site will be attenuated based on the amount of time per cycle the light beam remains obstructed and unhindered because less light will be received at the site per unit of time.

For purposes of explanation, the term "cycle time" of the interrupter is the sum of the unhindered and interrupted time for a cycle, the "repetition rate" is the number of cycles in a given time period, and the "duty cycle" is the ratio of unhindered time to the cycle time. The repetition rate is essentially the frequency of the interrupter, but preferably with a square profile rather than a sinusoidal profile. The duty cycle can range from 0% (no light passes) to 100% (no attenuation).

Preferably, the interrupter is moved into and out of the path of the light beam at a repetition rate such that the interruption of the beam is not perceived as flashing light by the human eye. To achieve this, the repetition rate should be greater than 30 cycles and preferably greater than 60 cycles per second. Although usable, certain repetition rates may not be preferred. For example, background lights in the surgical theater can flicker at certain frequencies (e.g., 60 cycles per second in the United States and 50 cycles per second in other areas). Such lights may produce interference with an attenuator running at 60 or 50 cycles a second, depending on location. The brightness of a light beam compared to its un-attenuated state is approximately proportional to the duty cycle of the interrupter. Using the example of a repetition rate of 75 cycles per second, the cycle time is approximately 13.3 milliseconds. If the duty cycle is 40%, meaning that the light is unhindered for 5.32 milliseconds of the cycle, the attenuated light beam will appear to be approximately 40% as bright as the un-attenuated light beam. Brightness adjustment can be achieved by changing the duty cycle of the interrupter and by changing the repetition rate as necessary to maintain the experience of non-flashing (i.e., continuous) light. According to various embodiments, the interrupter can be linearly placed into and removed from the light beam or rotated into and out of the light beam.

Figure 1A:
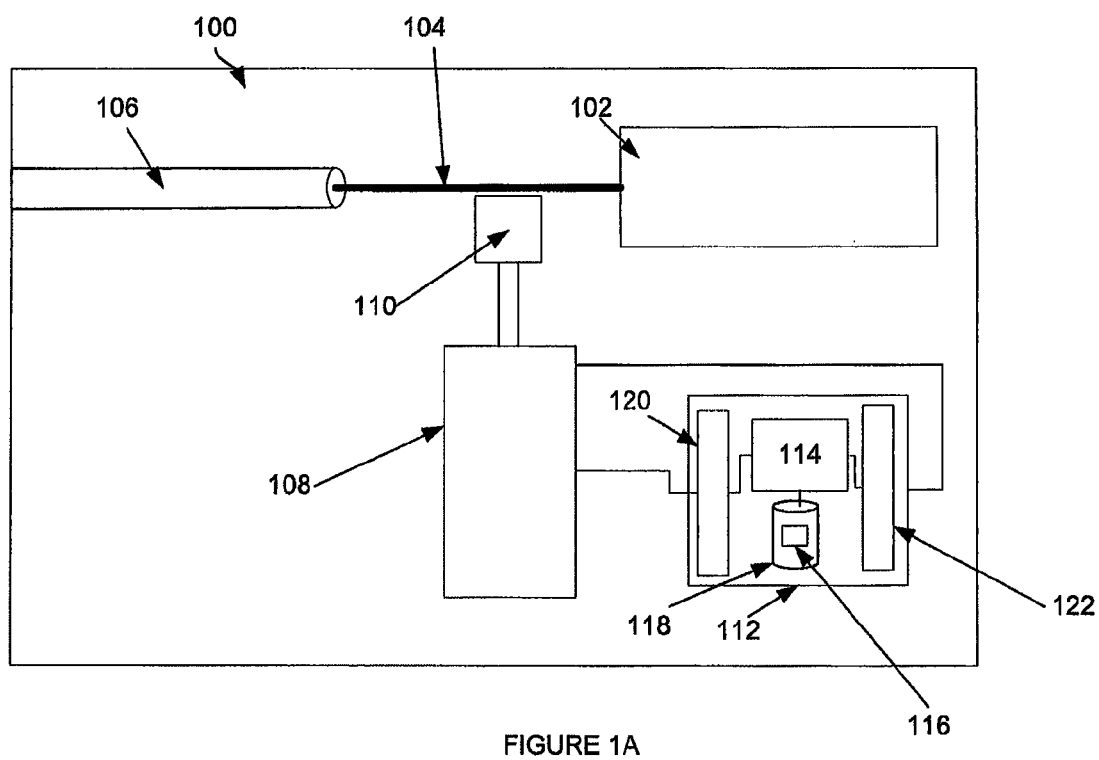

FIGS. 1A and 1B are diagrammatic representations of one embodiment of a system 100 for attenuating a light beam in a surgical system utilizing fiber optics. In system 100, a light source projects a light beam 104 to an optical fiber 106. Light source 102 can comprise light sources such as a xenon light source, a laser, an LED or other light source used to illuminate or ablate tissue. Optical fiber 106 can be a plastic, glass or other material fiber that guides light from light beam 104 to a surgical handset or otherwise guides light to a surgical site. Linear actuator (linear motor, solenoid, pneumatic cylinder, hydraulic cylinder, etc.) 108 moves an interrupter 110 into and out of the path of light beam 104 between the light source and optical fiber 106. Interrupter 110 moves from a position in which light beam 104 is unhindered by interrupter 110 (shown in FIG. 1A) to a position in which light beam 104 is fully incident on interrupter 110 (shown in FIG. 1 B). It should be noted that system 100 can include other optical components located between optical fiber 106 and light source 102. Additionally, the path of light beam 104 may not be straight.

A controller 112 can control the motion of linear actuator 110. Controller 112 can include any suitable controller that can receive data from various components of system 100. Controller 112 can include a processor 114 (such as an ASIC, CPU, DSP or other processor) and computer instructions 116 executable by processor 114 (e.g., software or other instructions stored on a computer readable medium). Instructions 116 can be stored on a computer readable memory 118 (e.g., hard drive, Flash memory, optical memory, RAM, ROM, processor memory or other computer readable medium known in the art). Controller 112 can include any number of additional computer components. For example, controller 112 can include an analog to digital converter 120 to convert signals from linear actuator 108 to digital signals, and a digital to analog converter 122 to convert signals from processor 114 to analog control signals. While shown as communicating electrical analog signals to a linear actuator 108, controller 112 can send electrical digital or analog, or pneumatic, control signals to actuator 108 or to other controllers to cause actuator 108 to operate according to a particular control scheme. Additionally, while controller 112 is shown as a single block in FIG. 1 for the sake of simplicity, the control functionality of system 100 can be distributed among multiple processors.

In operation, linear actuator 108 is controlled to move interrupter 110 into and out of light beam 104. In the embodiment of FIG. 1 in which a linear motor is used, interrupter 110 reciprocates from a position in which light beam 104 is unhindered (e.g., as shown in FIG. 1A) and a position in which light beam is fully incident on interrupter 110 (e.g., as shown in FIG. 1B). In other words, the stroke of linear actuator 108 is sufficient to linearly position the interrupter fully into the light beam. Preferably, interrupter 110 is made of a non-transmissive material to fully block light beam 104 when light beam 104 is fully incident on interrupter 110. As one example, interrupter 110 can be formed of aluminum.

According to various embodiments, controller 112 can receive attenuation control parameters that affect the control scheme according to which controller 112 controls actuator 108. These parameters can include, for example, duty cycle and repetition rate or other parameters. In other embodiments, one or more of the attenuation control parameters can be predefined at controller 112.

Controller 112 can, for example, control linear actuator 108 to have a particular repetition rate and duty cycle. The duty cycle can range from 0 to 100% of the cycle time. Preferably, the repetition rate is selected so that if the duty cycle is greater than 0% and less than 100% of the cycle time, the human eye will not perceive flickering of the light (at 0% duty cycle, the interrupter is continuously in the path of light beam 104 and, at 100% duty cycle, the interrupter does not interrupt the light beam 104). Generally, repetition rates of greater than 60 cycles per second will not be visible to the human eye so that the resulting light appears continuous and attenuated.

Actuator 108 can be selected to have sufficient energy to move interrupter 110 between states in which light beam 104 is unhindered to a state where light beam 104 is fully incident on interrupter 110 in as short a time as possible to minimize the transition period in which light beam 104 is only partially incident on interrupter 110. Furthermore, controller 112 can account for the fact that actuator 108 is moving a mass that must accelerate and decelerate to reciprocate. Consequently, interrupter 110 may be moving in the time in which light beam 104 is fully unhindered and the time in which light beam 104 is fully incident on interrupter 110. For example, if the cycle time is 13.3 milliseconds and the time that light beam 104 is fully incident on interrupter 110 is 8 milliseconds, interrupter 110 can be moving during the 8 milliseconds it is blocking light beam 104.

Figure 2A:
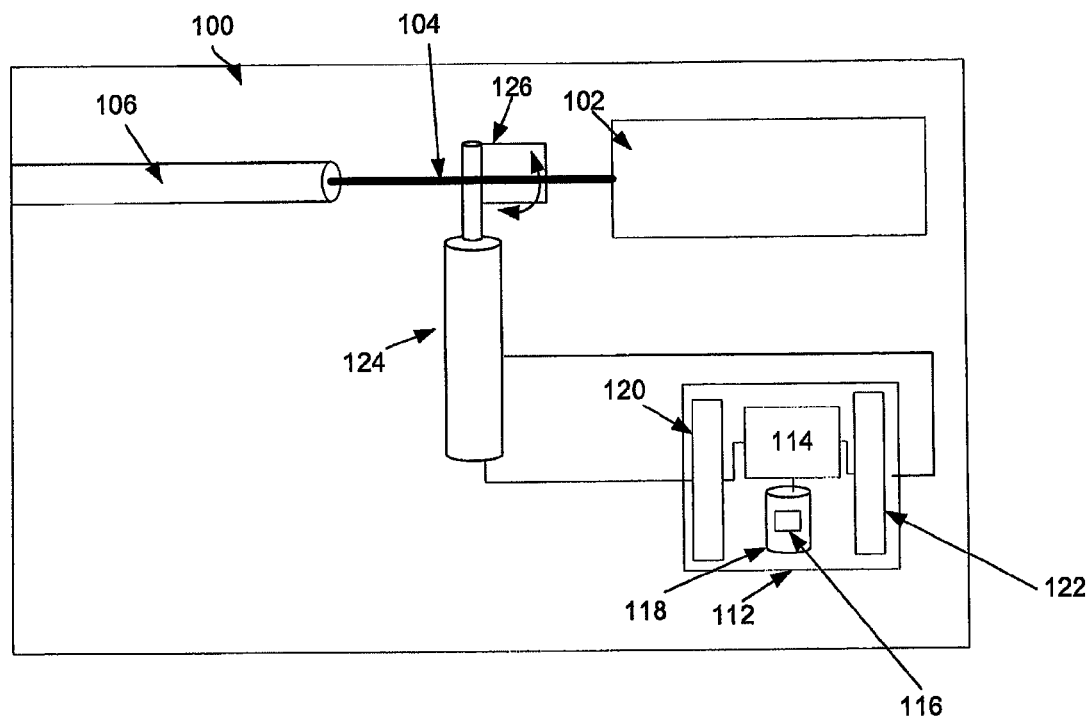
FIGS. 2A-2B are diagrammatic representations of another embodiment of a system for attenuating a light beam.
Figure 2B:
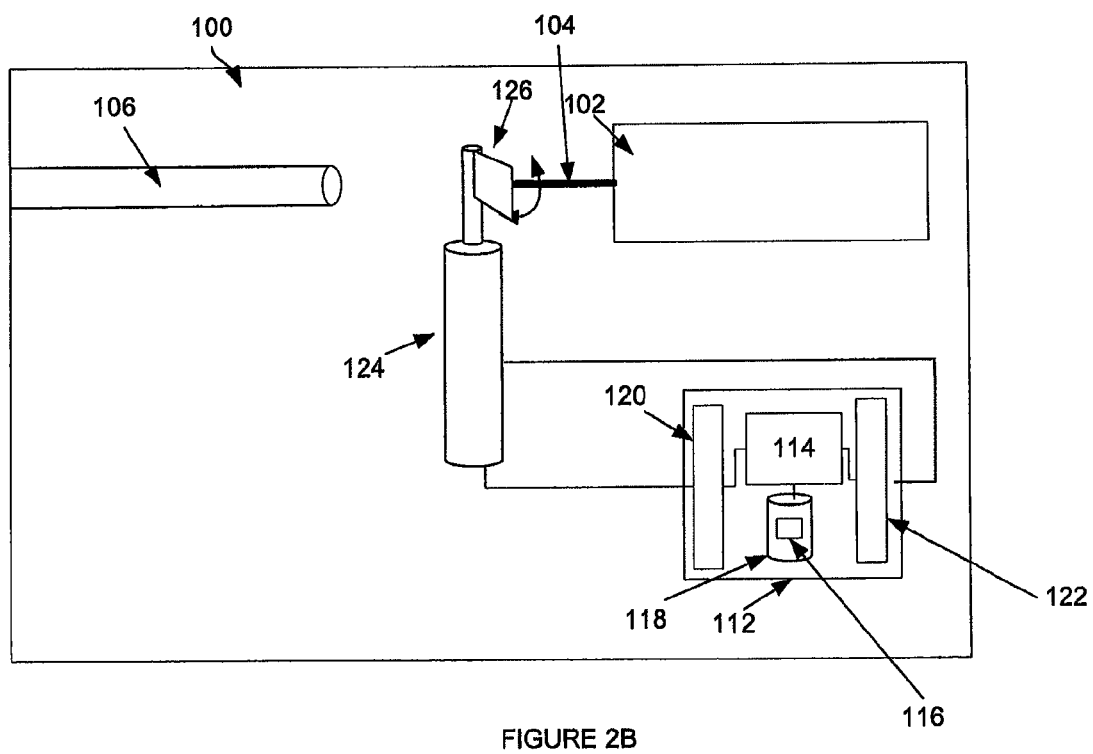

In the above example, a linear actuator is used to selectively interrupt light beam 104. FIGS. 2A and 2B are diagrammatic representations of another embodiment of the present invention in which a rotary actuator 124 rotates interrupter 126 into and out of the path of beam 104. Actuator 124 can be a rotary motor, a rotary action hydraulic or pneumatic device to impart rotary motion or other rotary actuator. According to one embodiment, rotary actuator 124 can rotate back and forth to move interrupter 126 into and out of the path of light beam 104. According to one embodiment, rotary actuator 124 alternately rotates 90 degrees. Again, the repetition rate can be selected so that interruption of the light beam is not perceived by a human eye to which light is directed by optical fiber 106.

Figure 3A:
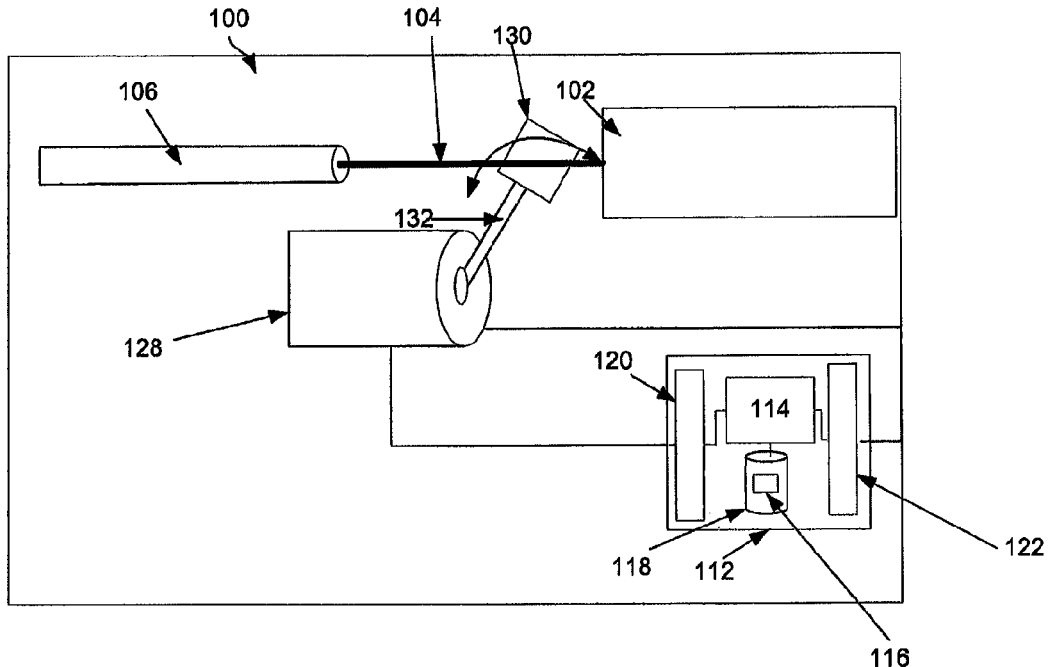
FIGS. 3A-3B are diagrammatic representations of yet another embodiment of a system for attenuating a light beam.
Figure 3B:
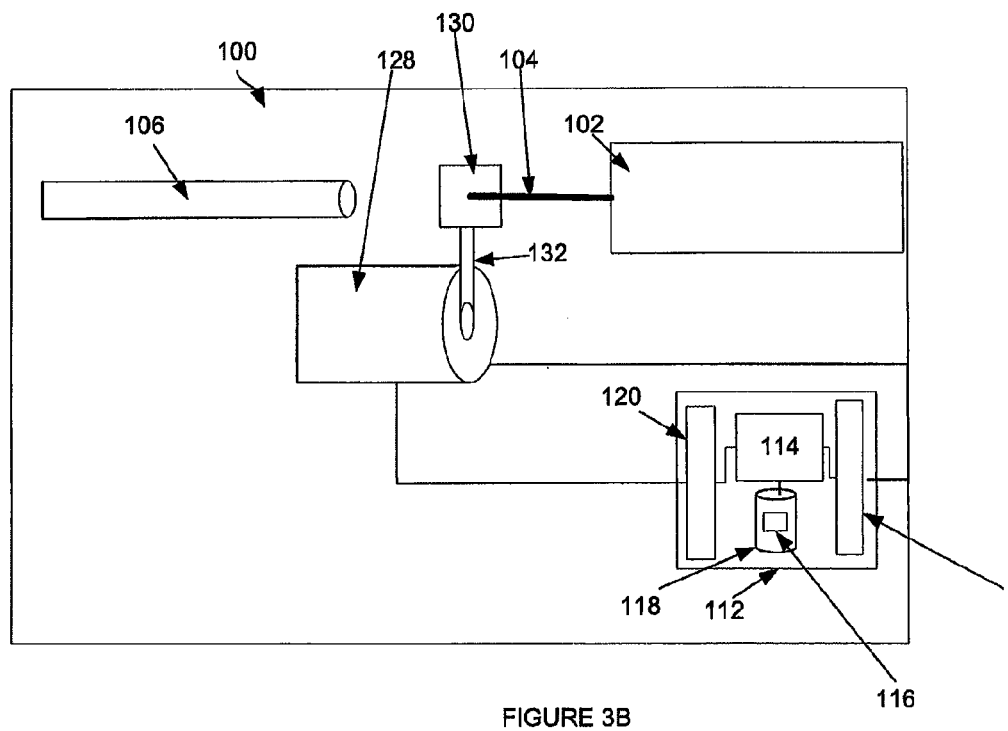

FIGS. 3A and 3B are diagrammatic representations of yet another embodiment that utilizes a rotary actuator 128 to move interrupter 130 into and out of the path of light beam 104. In the example of FIGS. 3A and 3B, interrupter 130 is coupled to actuator 128 by an arm 132. As actuator 128 moves arm 132, interrupter 130 swings into and out of the path of light beam 104. For example, rotary actuator 128 can alternately rotate a set number of degrees, say 30 degrees, to swing interrupter 130 into the path of light beam 104 to fully block light beam 104 and out of the path of light beam 104 to leave light beam 104 unhindered by interrupter 130. According to other embodiments, interrupter 130 can swing through an arc such that for one cycle interrupter 130 is on one side of the beam path when light beam 104 is unhindered and for the next cycle is on the other side of the beam path when light beam 104 is unhindered. Controller 112 can control actuator 128 such that a particular repetition rate and duty cycle are achieved.

Figure 4:
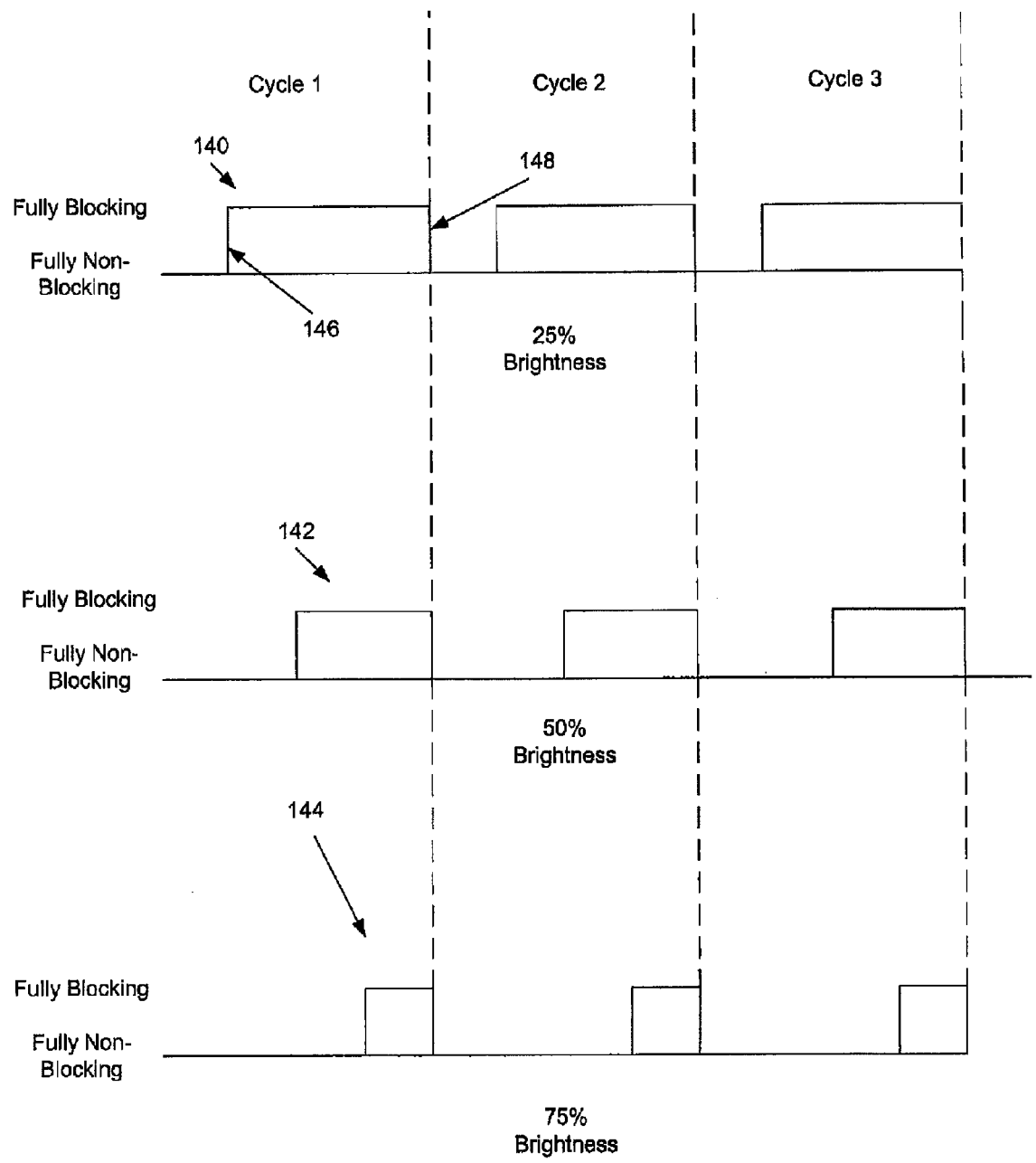
FIG. 4 illustrates example duty cycles for various levels of attenuation.

FIG. 4 is a set of graphs representing one embodiment of cycle states for various levels of attenuation of light beam 104. In the example of FIG. 4, the cycle time is 16 milliseconds, corresponding to a repetition rate of 62.5 cycles per second. Line 140 represents a 25% duty cycle, line 142 represents a 50% duty cycle and line 144 represents a 75% duty cycle. As can be seen from line 140, the interrupter 130 is in a position in which light beam 104 is fully unhindered for approximately 4 milliseconds and fully blocked for 12 milliseconds, resulting in 75% attenuation of light beam 104 (i.e., light beam 104 will only appear to be 25% as bright downstream of the interrupter 130 as it appears upstream of interruptor 130). During each state (e.g., the fully blocking and the fully non-blocking state) the interrupter 130 can still be moving, so the states of the interrupter 130 with respect to light beam 104 may, but do not necessarily, correspond to the actuator 128 states. In other words, a graph of the actuator 128 state may be different than the graph of the interrupter 130 state relative to light beam 104.

The transitions (e.g., transition 146 and transition 148) between a fully blocking and fully non-blocking state shown in FIG. 4 are shown as corresponding to a square wave. That is, they are shown as instantaneous transitions. In practice, there is some small transition zone in which light beam 104 is only partially blocked. If that transition zone is too long, some of the negative effects of position domain attenuators, such as shadow rings, may be seen briefly. Therefore, it is preferable to make the transition as close to ideal as possible to minimize the transition time.

Embodiments of the present invention thus provide a light attenuation system comprising a light source to project a light beam, an interrupter operable to be positioned into and out of a path of the light beam, an actuator coupled to the interrupter and operable to move the interrupter from a position in which the light beam is unhindered by the interrupter to a position in which the light beam is fully incident on the interrupter, and a controller operable to control the actuator and cause the actuator to move the interrupter with a repetition rate so that the light beam is unhindered for a first portion of a cycle and the light beam is fully incident on the interrupter for a second portion of the cycle to attenuate the light beam's brightness. Attenuation can thus be achieved without affecting the color temperature of the light.

Another embodiment of the present invention can include a set of computer instructions comprising instructions executable to receive one or more attenuation control parameters. The attenuation control parameters can include any variables that can be user specified. According to the particular implementation, these can include duty cycle, cycle time, repetition rate, attenuation level or other parameters. Based on the received control parameters and/or predefined control parameters, the instructions are executable to determine a control scheme. For example, if the system has a preprogrammed repetition rate, the instructions can be executable to receive a duty cycle or other parameters. Based on the received parameters and the predefined repetition rate, the amount of time that a light beam is fully interrupted versus unhindered can be determined. Accordingly, the control scheme is configured to cause an interrupter to move into and out of a path of a light beam for a plurality of cycles with a repetition rate to attenuate the light beam's brightness. In general, the light beam is unhindered by the interrupter for a first portion of each cycle and is fully incident on the interrupter for the second portion of the cycle.

The instructions can be further executable to generate one or more control signals to cause an actuator to move the interrupter into and out of the path of the light beam according to the control scheme. The control signals can be sent to the actuator, another control or other component that can cause the actuator to move according to the control scheme.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A computer program product comprising a non-transitory computer readable medium storing a set of computer instructions, the set of computer instructions comprising instructions executable by a processor to:
   receive one or more attenuation control parameters;
   determine a control scheme to cause an interrupter to move into and out of a path of a light beam for a plurality of cycles with a repetition rate to attenuate the light beam's brightness, wherein the light beam is unhindered by the interrupter for a first portion of each cycle and is fully incident on the interrupter for the second portion of the cycle; and
   generate one or more control signals to cause an actuator to move the interrupter into and out of the path of the light beam according to the control scheme.

2. The computer program product of claim 1, wherein the repetition rate is selected so that light from the light beam attenuated by the interrupter appears attenuated and continuous to a human eye.

3. The computer program product of claim 1, wherein the repetition rate is at least 30 cycles per second.

4. The computer program product of claim 1, wherein the repetition rate is at least 60 cycles per second.

* * * * *